Figure 1:
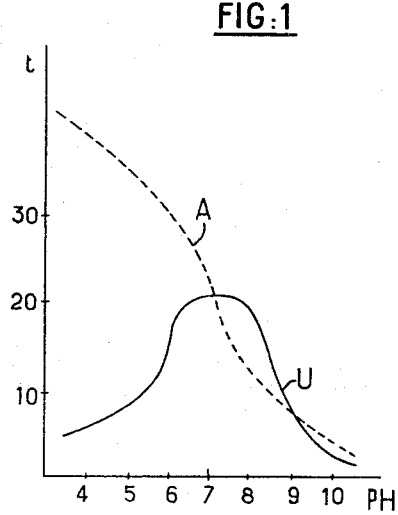

Nov. 30, 1965

M. RAMBAUD 3,220,851

METHOD OF TREATMENT OF SOYA

Filed July 12, 1962

INVENTOR
MICHEL RAMBAUD
BY Irvin S. Thompson
ATTY.

3,220,851
METHOD OF TREATMENT OF SOYA
Michel Rambaud, Paris, France, assignor of one-half to Societe Industrielle des Oleagineux, Paris, France, a corporation of France
Filed July 12, 1962, Ser. No. 209,397
Claims priority, application France, July 27, 1961, 869,193
5 Claims. (Cl. 99—98)

The present invention relates to the treatment of soya beans and is directed to a process intended to improve their food quality and their facility of use.

It is known that raw soya beans have only a low food value, which is due to the fact that in the natural state soya contains various undesirable compounds, amongst which there may be cited in particular:

Antitrypsin, which is an inhibitor of trypsin and a substance of enzymatic nature;
Other enzymes: urease, lipase, lipoxidase;
Certain proteins of a toxic character and also thermolabile;
Bitter substances with a flavour of green peas.

In order to eliminate these different substances, at least partially, it has been proposed to subject the soya, either in the form of flour or the raw beans, to a cooking operation. This cooking is followed by a drying operation. It has also been proposed to carry out the cooking in a very highly alkaline medium.

Treatments in a very highly alkaline medium result in the destruction of the sulphur amino-acids of the soya, which substantially reduces the food value of the product.

The other known treatments improve the qualities of the soya but they result in a degradation of the proteins. The latter may thus become less readily assimilable, but they especially become less dispersible in water, which is a considerable drawback for many uses and in particular when the soya has to be utilized in the form of aqueous suspensions, which are then not stable (in the case of suspensions intended as a substitute for milk, for example).

The present invention has for its object a method which enables the undesirable compounds to be eliminated from the soya, while preserving the qualities of the proteins and avoiding the destruction of the sulphur amino-acids.

This method comprising cooking the soya in an aqueous alkaline suspension, followed by a drying operation, is characterized in that the cooking is effected at a temperature at most equal to 80° C. and with a pH value between 8 and 9.

By proceeding in accordance with this method, there is effected a careful alkaline cooking of the soya suspension. This cooking is sufficient to ensure the destruction of the undesirable compounds, antitrypsin, urease, etc., but does not adversely affect the quality of the proteins.

By virtue of these conditions of treatment, the soya suspension subjected to cooking may have added to it a proteolytic enzyme which, acting during the cooking, has a beneficial effect on the final product, and in particular ensures a better dispersion of the product in water at the moment of its utilization. By this addition of enzymes, the final product possesses physical properties similar to those of raw proteins.

With a cooking temperature in the vicinity of 80° C. and a pH value comprised between 8 and 9, the duration of cooking is less than 20 minutes for a concentration of soya of 20% by weight. This period of cooking can vary with the temperature and the concentration.

It is longer with a lower temperature or with a higher concentration.

The researches made by the applicants have shown that the cooking of a suspension at the natural pH value of the flour of whole soya beans would involve a reduction of the percentage of albumines, part of the proteins dispersible in water. This insolubilization increases with the duration of cooking and especially with the temperature. By operating on a suspension containing 20% of soya and 80% water, they have observed that the content of albumin, which is 65% of the proteins in the raw bean, is reduced to 60%:

In more than 8 hours at a temperature of 70° C.,
In 5 hours at a temperature of 75° C.,
In 2 hours at a temperature of 80° C.,
In 25 minutes at a temperature of 85° C.,
In 10 minutes at a temperature of 90° C.

It thus appears that the temperature of 80° C. constitutes a threshold value beyond which the speed of degradation of the albumins increases rapidly, and it is therefore essential not to exceed this value.

It has been observed that a temperature of 86° C., the destruction of the undesirable compounds depends on the pH value of the suspension. The applicants have specially studied the disappearance of the urease and the antitrypsin: the urease because its content constitutes the usual test of the cooking of the soya and because its presence may be undesirable in certain cases; the antitrypsin because its presence slows down the trypsic attack during the course of digestion. The conditions for the destruction of the other undesirable factors are comprised between those for urease and those for antitrypsin.

Figure 2:
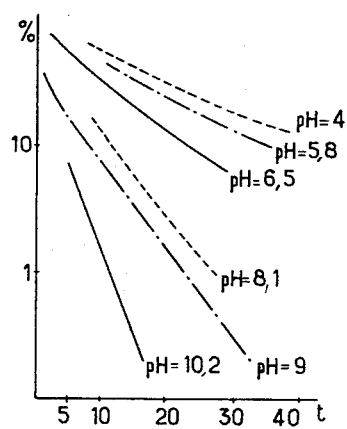

Some of the results obtained have been shown by means of the accompanying drawings, in which:

FIG. 1 indicates the cooking time in minutes at 80° C. necessary to obtain a destruction of 90% of the urease (curve U) and of the antitrypsin (curve A), as a function of the pH value of the suspension;

FIG. 2 indicates the percentage of residual antitrypsin as a function of the cooking time in minutes for different values of the pH of the suspension.

It can thus be seen that satisfactory elimination of the undesirable factors urease and antitrypsin is obtained with a pH value comprised between 8 and 9, and that with this pH value, the elimination is satisfactory for an acceptable duration of cooking of the order of 20 minutes, which is a suitable value in order to prevent degradation of the proteins which results in a reduction of the content of albumin.

The effect of the treatment is completed by the addition of a proteolytic enzyme. Such enzymes may be of vegetable origin such as papain and ficin, or of animal origin such as pancreatin, of bacterial or fungic origin obtained by biosynthesis.

When added to the soya suspension in a proportion of 0.1 to 0.5%, the enzymatic preparation solubilizes the proteins, fluidifies the mass and permits treatment at a higher concentration.

It should be observed that the treatment conditions, temperature 80° C. and pH value between 8 and 9, are not the most favourable conditions for the action of the proteolytic enzyme. However, in consideration of the descruction of the undesirable compounds, urease, antitrypsin, etc., and the preservation of the proteins, the addition of the enzyme ensures a proteolysis which, although partial, is however effective. It ensures a good dispersion of the dried product and facilitates the fluidification of the suspension during the cooking, which enables the concentration of the suspension to be increased during this treatment. Whereas without enzyme, the concentration is limited to 20 to 25% of soya, with the addition of enzyme this concentration may be increased and brought up to 30% and more. At a concentration of 35% of soya, the duration of cooking sufficient to destroy the undesirable factors is 1 hour at 80° C. It may be preferable to accept a longer cooking time and to reduce the quantity of proteolytic enzyme added.

It appears immediately that the increase in concentration has the result of reducing the cost of drying. In addition, the adding of enzyme renders the dried product more readily capable of dispersal in water, and this constitutes a further advantage. This result can be attributed to the effect of the partial proteolysis by the enzyme causing the break-up of the large protein molecules, the fragments of which are no longer rendered insoluble by drying.

After the cooking has been effected under these conditions and having achieved the practically total elimination of the antitrypsin and the urease, the drying operation is proceeded with.

As it would not be desirable to deliver to the consumer a product which remained alkaline, there is an advantage in reducing, before or during the drying, the pH value which is brought up to the suitable figure for cooking. Furthermore, drying at a too-high pH value would be liable to result in a degradation of the sulphur aminoacids which are an important factor of the food value of soya.

In accordance with the invention, after having ensured the destruction of the antitrypsin and the urease at a suitable pH value, the pH value is modified for the drying operation by bringing it into the vicinity of neutrality.

A particular means of obtaining this result directly consists of utilizing ammonia as an alkalizing agent for the cooking.

Under the conditions specified, the ammonia added to the suspension of soya dissolves in the suspension water and remains there during the cooking operation, as the temperature reached do not cause its evaporation. However, in the subsequent drying treatment at a higher temperature, the ammonia evaporates and the suspension becomes spontaneosuly neutralized. In this way, without subsequent action, the best conditions are obtained for the double treatment of cooking and drying.

During the course of this treatment, the bitter flavour is removed.

In the treatment for improving soya beans as described above, various additions can be made to the treated suspension so as to enrich the product obtained. Thus, it is possible to add to the suspension, monoglycerides, fatty substances, skimmed milk, various condiments, or any substance capable of facilitating the treatment and/or of improving the adaptation of the finished product to its various uses.

EXAMPLE 1

Soya beans of the so-called Yellow No. 2 quality, previously decorticated, are finely ground to a fineness determined by a sieve Afnor 24. The product resulting from the grinding is put into suspension while cold or at low temperature in an alkaline lye, so that the concentration of dry material is 20%.

The alkaline lye utilized is such that the pH value of the suspension is equal to 9. It is preferably prepared simultaneously with lime and ammonia. A good preparation for 1,000 kg. of soya is a solution containing 4 kg. of lime; to the suspension obtained, there is added 2.5 kg. of ammonia (quantities expressed in CaO and $NH_3$).

The alkaline suspension thus obtained is then heated to a temperature of 80° C. The heating is effected by surface or better still by injection of steam. The duration of the cooking treatment is 20 minutes.

The suspension thus treated is then subjected to drying in order to eliminate the water. At the same time, the ammonia is driven-off and the dried product returns to the neutral state.

This product is freed of 99% of its initial antitrypsin in the soya beans, and it is entirely free from urease.

EXAMPLE 2

Soya beans decorticated and ground as in the previous example are put into suspension in order to obtain a concentration of 25% of dry material in an alkaline lye containing, per 1,000 kg. of soya, 4,000 litres of water, 3.5 kg. of lime and 2 kg. of ammonia (expressed in CaO and $NH_3$) together with 5 kg. of a proteolytic enzyme preparation of vegetable origin, papain, at a titer of 80.

The alkaline suspension thus constituted is heated to 80° C. and is kept at that temperature for 30 minutes.

The drying is effected by spraying in an atomizer or on a cylinder drier provided with jets ensuring the distribution of the product over the heating surface.

EXAMPLE 3

Soya beans similar to those of the previous examples and decorticated, ate coarsely ground. 1,000 kg. of soya beans with 10% moisture content are placed in a mixer which receives 1700 litres of water to which are added 4 kg. of lime and 1.5 kg. of ammonia (counted in CaO and $NH_3$) together with 1 kg. of a preparation of proteolytic enzyme of microbic origin, the effectiveness of which is substantially the same as that of the papain preparation utilized in Example 2. The mass is brought up, with continuous mixing, to a temperature of 75° and is maintained at that temperature for 3 hours. The drying of the treated product is effected in a flow of hot air with recycling of a portion of the product already dried in order to reduce the water content of the product at the beginning of the drying operation.

What I claim is:

1. A method of improving the food qualities of soya by destroying undesirable compounds such as antitrypsin and urease while preserving the dispersibility of the protein, comprising forming an aqueous alkaline suspension of ground raw soya having a pH between about 8 and 9 and a soya concentration of about 20–35% by weight, incorporating in the suspension a proteolytic enzyme, and cooking said suspension at a temperature of about 75–80° C. for a period of time that varies according to the temperature and the concentration, from about 20 minutes for a temperature of about 80° C. and a concentration of about 20%, to about 3 hours for a temperature of about 75° C. and a concentration of about 35%.

2. A method as claimed in claim 1, and thereafter drying the treated material.

3. A method as claimed in claim 1, in which the alkalinity of the suspension is achieved at least in part by the addition of ammonia.

4. A method as claimed in claim 1, in which monoglycerides, fatty substances and skimmed milk are added to the alkaline suspension of soya.

5. A method as claimed in claim 1, in which the ground raw soya is produced from decorticated soya beans.

References Cited by the Examiner

UNITED STATES PATENTS

| | | | |
|---|---|---|---|
| 548,424 | 10/1895 | Bergtold et al. | 99—99 |
| 1,850,095 | 3/1932 | Dengler | 260—412.3 |
| 2,487,698 | 11/1949 | Diamond | 99—17 XR |
| 2,495,706 | 1/1950 | De Voss et al. | 99—17 |
| 2,614,045 | 10/1952 | Learmouth | 99—99 |

(Other references on following page)

UNITED STATES PATENTS

| | | | |
|---|---|---|---|
| 2,627,465 | 2/1953 | Pettibone | 99—99 X |
| 2,795,502 | 6/1957 | Raymond | 99—98 |
| 2,881,159 | 4/1959 | Circle et al. | 99—98 X |
| 3,097,947 | 7/1963 | Kemmerer | 99—98 X |

FOREIGN PATENTS

| | | |
|---|---|---|
| 18,936 | 1900 | Great Britain. |

OTHER REFERENCES

Markley: "Soybeans and Soybean Products," vol. 1, 1950 Interscience Publ. Inc.: New York, pp. 280, 281, 365, 400 to 402.

A. LOUIS MONACELL, *Primary Examiner.*

BEATRICE H. STRIZAK, *Examiner.*